(12) United States Patent
Wahl et al.

(10) Patent No.: US 7,007,398 B2
(45) Date of Patent: Mar. 7, 2006

(54) DEVICE FOR MEASURING LENGTH

(75) Inventors: Claudia Wahl, Weinsberg (DE);
Andrea Golowin, Erlenbach (DE);
Rosemarie Bauer, Tamm (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/451,497

(22) PCT Filed: Dec. 18, 2001

(86) PCT No.: PCT/DE01/04777

§ 371 (c)(1),
(2), (4) Date: Dec. 22, 2003

(87) PCT Pub. No.: WO02/052220

PCT Pub. Date: Jul. 4, 2002

(65) Prior Publication Data
US 2004/0103551 A1 Jun. 3, 2004

(30) Foreign Application Priority Data

Dec. 22, 2000 (DE) ................................ 100 64 734
Jul. 4, 2001 (DE) ............................ 201 10 905 U

(51) Int. Cl.
G01B 11/04 (2006.01)
(52) U.S. Cl. ......................................... 33/707; 33/706
(58) Field of Classification Search .................. 33/707, 33/706, 708, DIG. 1, DIG. 2
See application file for complete search history.

(56) References Cited

U.S. PATENT DOCUMENTS

| 4,170,829 A | * | 10/1979 | Nelle ........................... 33/706 |
|---|---|---|---|
| 4,600,203 A | * | 7/1986 | Miller et al. ................... 33/706 |
| 4,730,247 A | | 3/1988 | Takahara |
| 4,843,729 A | * | 7/1989 | Nagaoka et al. ............... 33/708 |
| 5,164,576 A | | 11/1992 | Anglin et al. |
| 5,295,485 A | | 3/1994 | Shinomura et al. |
| 5,511,321 A | | 4/1996 | Nelle |

(Continued)

FOREIGN PATENT DOCUMENTS

| DE | 25 05 587 A | 8/1976 |
|---|---|---|
| DE | 34 32 511 A1 | 3/1985 |

(Continued)

OTHER PUBLICATIONS

Patent Abstracts of Japan publication regarding Japanese Publication 7-139935, published Jun. 2, 1995, published by Japanese Patent Office, vol. 1998, No. 07, Mar. 31, 1998, one page.

(Continued)

*Primary Examiner*—Christopher W. Fulton
(74) *Attorney, Agent, or Firm*—Brinks Hofer Gilson & Lione

(57) ABSTRACT

A linear measuring device having a tape-shaped measuring body that is arranged in a closed conduit, which is opened on at least one front face and a sensor, which is moved along the measuring body and the sensor picks up information stored on the measuring body. An evaluation unit, which evaluates the information obtained from the sensor and processes the information further and a fixation structure provided inside the conduit, which releasably fixes the measuring body in place inside the conduit in such a way that, when needed, the measuring body is replaced by being removed from a front face of the conduit.

40 Claims, 7 Drawing Sheets

U.S. PATENT DOCUMENTS

| | | |
|---|---|---|
| 5,979,238 A | 11/1999 | Boege et al. |
| 6,049,992 A | 4/2000 | Freitag et al. |
| 6,105,271 A | 8/2000 | Freitag et al. |
| 6,251,073 B1 | 6/2001 | Imran et al. |
| 6,772,531 B1 * | 8/2004 | Henshaw et al. ............. 33/706 |

FOREIGN PATENT DOCUMENTS

| | | |
|---|---|---|
| DE | 42 41 712 A1 | 6/1993 |
| DE | 43 20 728 A1 | 1/1995 |
| DE | 195 26 518 C1 | 12/1996 |
| DE | 196 11 983 C1 | 7/1997 |
| DE | 197 00 367 C2 | 7/1999 |
| JP | 7-139935 A | 6/1995 |

OTHER PUBLICATIONS

"Magnetisches Langenmesssystem MS01—Technical Handbook," published by Noesis, while the date of publication is unknown it is believed to have been publicly available prior to Dec. 22, 2000, pp. 1-19.

* cited by examiner

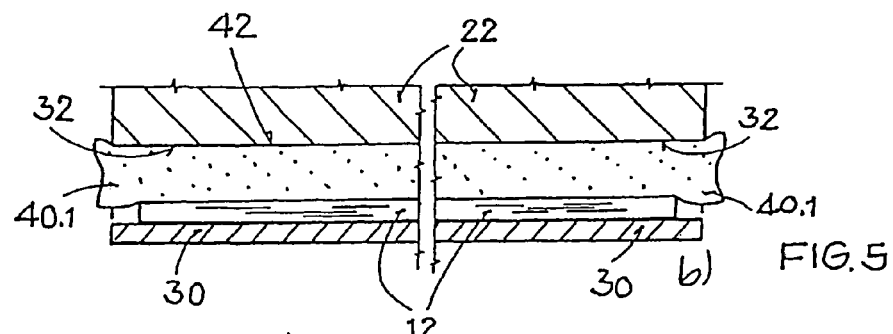
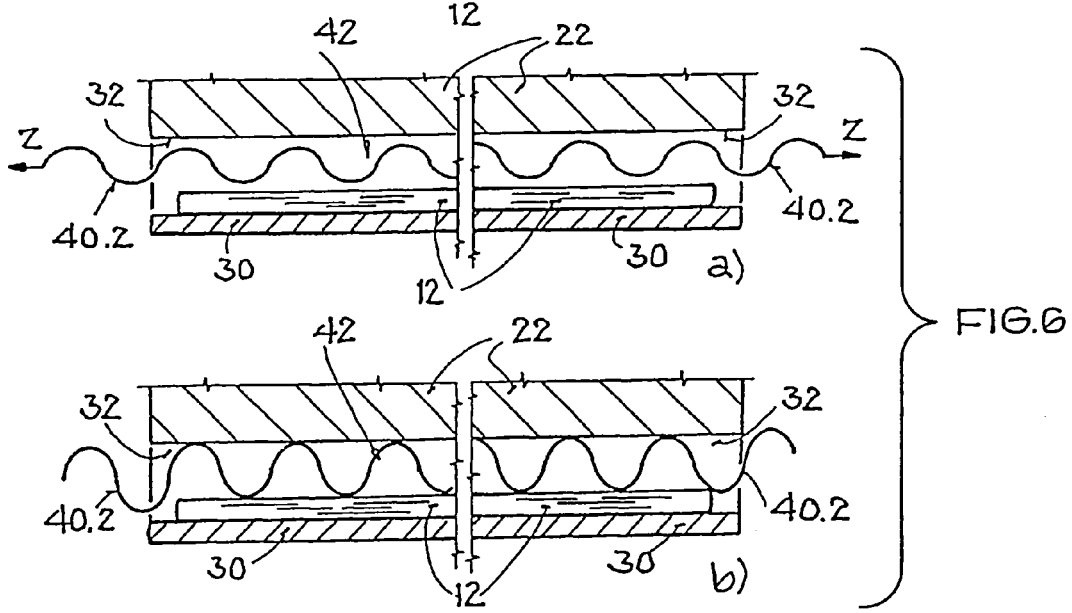
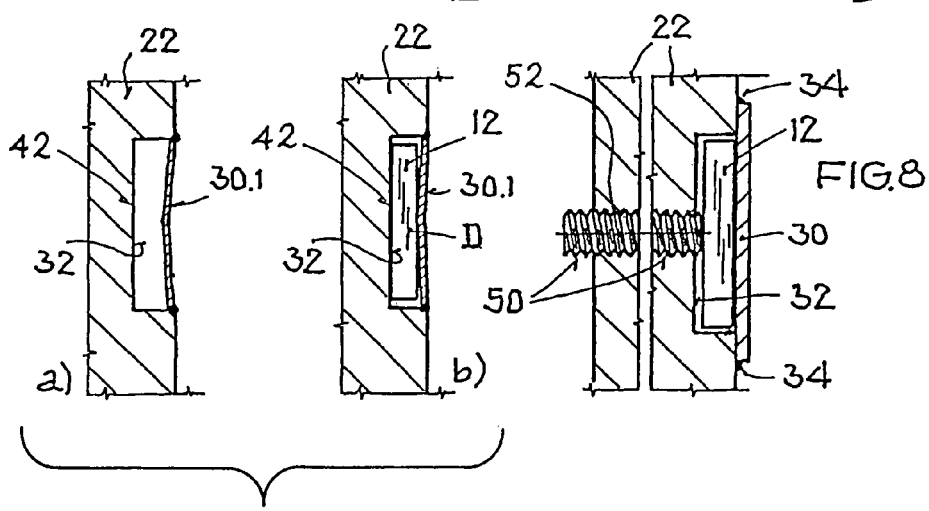
FIG. 5
FIG. 6
FIG. 7
FIG. 8

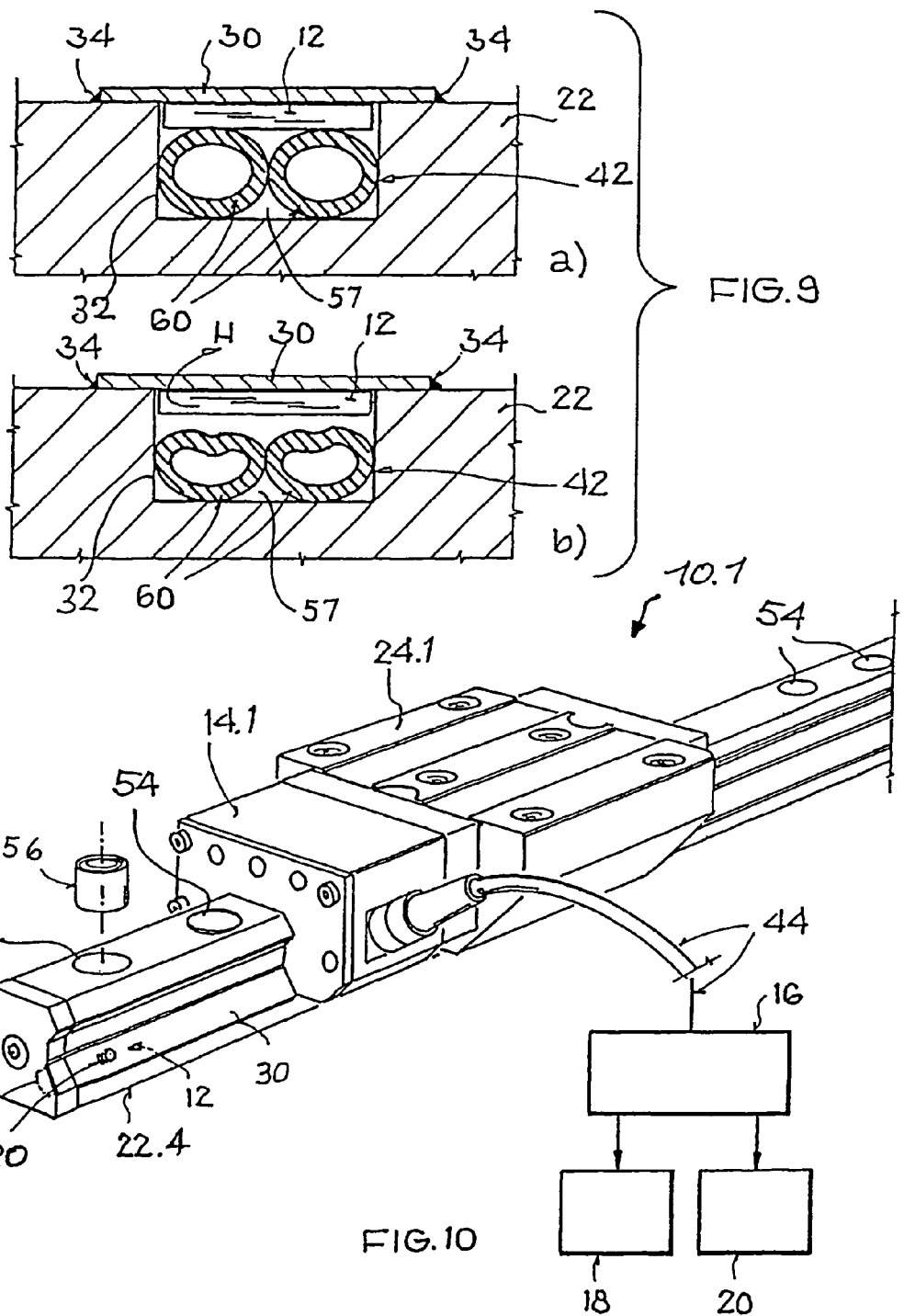

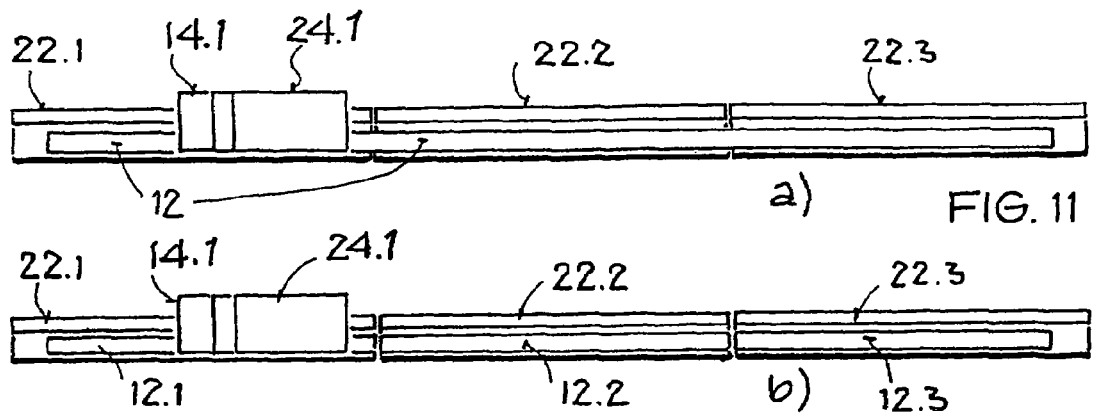
FIG. 11
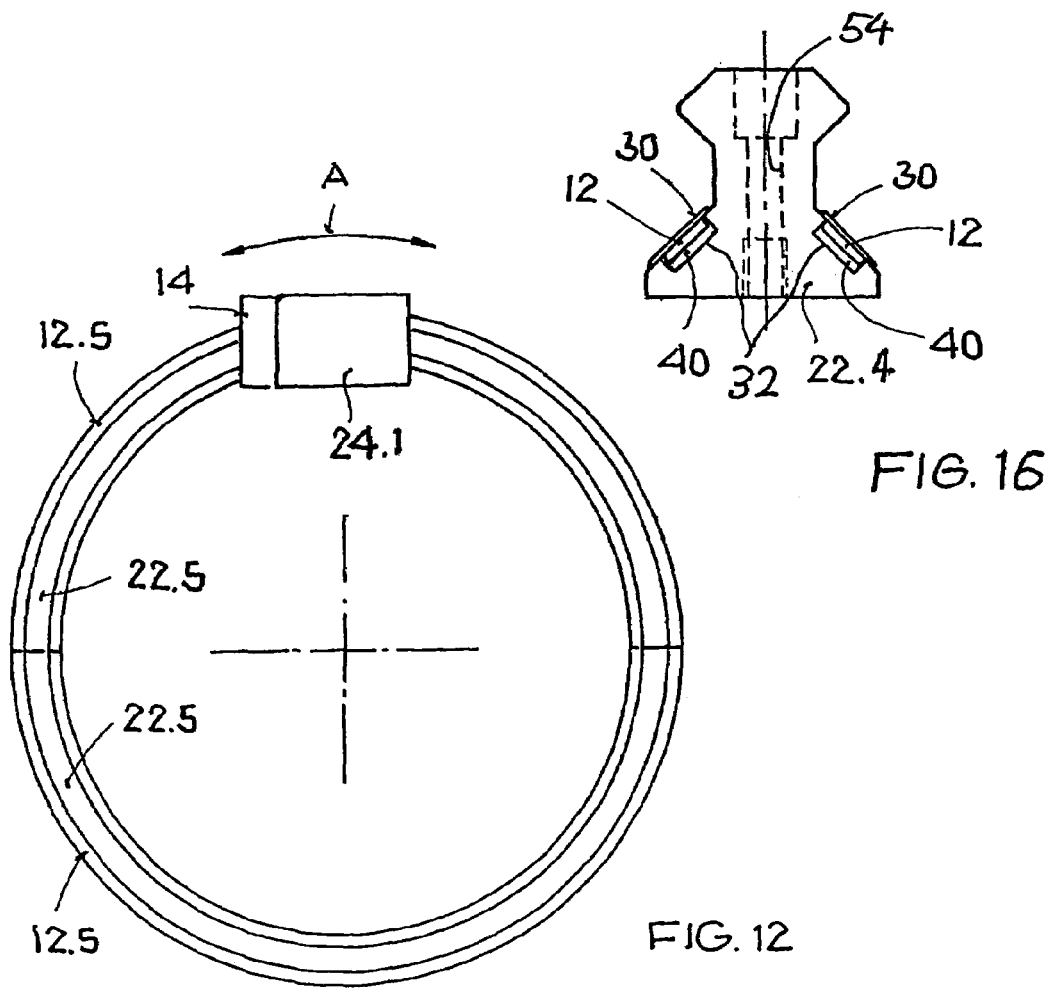
FIG. 16
FIG. 12

DEVICE FOR MEASURING LENGTH

Applicants claim, under 35 U.S.C. §§ 120 and 365, the benefit of priority of the filing date of Dec. 18, 2001 of a Patent Cooperation Treaty patent application, copy attached, Ser. No. PCT/DE01/04777, filed on the aforementioned date, the entire contents of which are incorporated herein by reference, wherein Patent Cooperation Treaty patent application Ser. No. PCT/DE01/04777 was not published under PCT Article 21(2) in English.

Applicants claim, under 35 U.S.C. § 119, the benefit of priority of the filing dates circularly in the longitudinal direction. of: (1) Dec. 22, 2000 of a German patent application, copy attached, Serial Number 100 64 734.0, filed on the aforementioned date, and (2) Jul. 4, 2001 of a German patent application, copy attached, Serial Number 201 10 905.0, filed on the aforementioned date, the entire contents of each of which are incorporated herein by reference.

BACKGROUND OF THE INVENTION

1. Field of the Invention

The present invention relates to a linear measuring device, having a tape-shaped measuring body, a sensor/sensors, which is/are moved along the measuring body and in the course of this picks up/pick up the information stored on the measuring body, evaluates/evaluate it, if needed, and passes/pass it on.

2. Description of the Related Art

Linear measuring devices are employed in many areas, for example with measuring machines, machine tools, metal processing machines, laser installations, positioning installations, wood-working machines, automatic insertion machines, handling installations, welding installations, eroding installations, presses, lifting platforms, elevators and so on.

Moreover, such linear measuring devices have their areas of use in connection with position determinations on linear axes, linear motors and displacement units.

In many areas a particularly great measuring accuracy is demanded here, which extends down into the nanometer range.

Problems with the pick-up of measuring data can be caused, for example, by chips, spraying coolant fog, solvents, common oils, greases, water and mechanical wear.

Linear measuring devices of the type mentioned at the outset are known and documented in the catalog "Magnetisches Langenmesssystem MS01—Technisches Handbuch" (Magnetic Linear Measuring System MS01—Technical Manual) of Noesis GmbH. The measuring system employed in this connection includes a measuring body, a connector cable and an evaluation system, having a sensor head and an electronic evaluation device. The sensor head picks up the position while being moved over the measuring body. In the course of this, the sensor takes information from magnetic fields and passes these signals on to the electronic evaluation device. The electronic evaluation device processes these signals into interface-usable protocols for the exact position determination.

A problem with known linear measuring devices lies in that they cannot be replaced in case of repairs, if they are permanently integrated into the respective existing component or into the machine. To protect the measuring bodies against chips, spraying coolant fog, solvents, common oils, greases, water and mechanical wear, they are integrated into enclosed spaces, which cannot be opened for disassembly or reassembly without destroying them, i.e. the parts of the known linear measuring devices surrounding the space, in particular along the measuring axis, cannot be completely reused, or used without subsequent treatment.

SUMMARY AND OBJECTS OF THE INVENTION

Based on the mentioned prior art, an object of the present invention is derived from the technical problem of disclosing a linear measuring device of the type mentioned at the outset, which assures the advantages regarding accuracy, dependability and protection of the known linear measuring devices, and at the same time makes an extremely efficient repair or replacement of existing components possible.

The linear measuring device in accordance with the present invention is defined by a linear measuring device having a tape-shaped measuring body that is arranged in a closed conduit, which is opened on at least one front face and a sensor, which is moved along the measuring body and the sensor picks up information stored on the measuring body. An evaluation unit, which evaluates the information obtained from the sensor and processes the information further and a fixation structure provided inside the conduit, which releasably fixes the measuring body in place inside the conduit in such a way that, when needed, the measuring body is replaced by being removed from a front face of the conduit.

Accordingly, the linear measuring device in accordance with the present invention is distinguished by the following characteristics: the measuring body is arranged in a closed conduit, which is open or can be opened only on at least one front face, and a fixation structure is provided inside the conduit, which releasably fix the measuring body inside the conduit in such a way that, when needed, the measuring body can be replaced by drawing it out, or inserting it, from the front face of the conduit.

An embodiment variation is preferably used in this connection which is distinguished in that the fixation structure fixes the measuring body in place by elastically applied pressure.

In view of the structurally existing circumstances in the industrial area, a particularly advantageous further development is distinguished in that the fixation structure pushes the measuring body against the inner area of the conduit facing the sensor/sensors.

In accordance with the present invention the releasable arrangement of the measuring body inside a closed system, makes the replacement of the measuring body possible without problems at any time, without it being necessary to replace or mechanically process guide rails, machine beds or other components, which are specially made for the measuring body, in their entirety. Simultaneously, because of the presence of the measuring body in a closed conduit, the measuring body is dependably protected against high stress or influences occurring in the industrial area, for example chips, spraying coolant fog, solvents, common oils, greases, water and mechanical wear, which can lead to measuring errors.

A preferred alternative embodiment is distinguished in that the fixation structure is embodied as a closed tape body, or as a tape body with an elastic hollow profiled cross section, and in particular with a valve unit, wherein the cross sectional dimensions of the tape body can be changed by changing the volume within the tape body, or of the profiled cross section, by the supply or removal of a liquid or gaseous medium. The tape body is preferably designed in the form of a cellular tape body.

A further particularly advantageous alternative is distinguished in that the fixation structure is embodied as elastic tape bodies, whose cross-sectional dimensions can be changed by changing a tensile force acting on the elastic tape body, wherein the elastic tape body can be embodied in particular as a rubber band or a corrugated tape. In case of the embodiment in the shape of a corrugated tape the conditions are such that, in the inserted state the corrugated tape is provided with a support point inside the closed conduit respectively at the extreme point of the wave trough, or the depth of the wave, which makes the dependable fixation of the measuring body in place possible.

In view of a particularly efficient production and of an embodiment which meets the demanded accuracy, the latter is distinguished in that the closed conduit is provided by a groove existing in a component and a cover tape covering the groove, wherein in accordance with a particularly preferred embodiment the cover tape, which is preferably designed as a sheet metal cover, is welded on or glued on. This variation offers particular advantages in regard to the demanded accuracy, because the cover tape can be arranged on the surface which has been ground of a component, by which it is possible to assure the exact geometric positioning of the cover tape, and therefore, in connection with the fixation structure, also of the measuring body arranged behind the cover tape.

The measuring body can be designed as a flexible measuring body tape or as a rigid measuring body tape.

A particularly preferred embodiment, which assures a very high accuracy of the linear measurement, is distinguished in that the linear measuring device is designed as a magnetic measuring device, i.e. the sensor/sensors picks up/pick up the different magnetic field strengths existing on the tape-shaped measuring body, and emits/emit its/their signals to the evaluation unit.

A particularly preferred embodiment, which assures a very high accuracy of the linear measurement, is distinguished in that the linear measuring device is embodied as an inductive measuring device, i.e. the sensor/sensors picks up/pick up the varying permeability values existing on the tape-shaped measuring body, and emits/emit its/their signals to the evaluation unit.

An alternative embodiment is distinguished in that the wall of the conduits assigned to the working area, i.e. the sensor/sensors, is embodied as an elastic wall, concavely arched inward into the conduit as viewed outside of the conduit and, in the state where it is inserted into the conduit, the measuring body pushes the convex (as viewed from inside of the conduit) wall area outward and is clampingly held thereby.

A particularly preferred embodiment is distinguished in that the fixation structure is embodied as individual elements, which are inserted from the rear of the conduit through a recess of the component enclosing the conduit and fixed in place therein (in the recess of the component), wherein the fixation structure is preferably embodied as screws.

The linear measuring device in accordance with the present invention can be preferably arranged in a guide profile, in a machine bed, or in other components particularly made for the measuring body.

It has been recognized by the present invention that the efficient employment of such linear measuring devices can be considerably increased because of the ability to replace the measuring body inside a closed conduit. In the case of a required repair, or a required replacement of the measuring body, the latter can be pulled out of the closed conduit because of the capability of releasing the provided fixation structure, and can be replaced by a fresh measuring body without it being necessary to rework or replace the entire guide profile, the entire machine bed, or any other component specially made for the measuring body. At the same time the measuring body is provided in a closed conduit and is therefore protected from rough environmental effects.

An alternative embodiment of the linear measuring device of the present invention, which should be considered independently from the above mentioned embodiments, is distinguished in that the measuring body is arranged in a closed conduit, which is open or can be opened only on at least one front face, and that the measuring body is first inserted into the circuit, is placed under a tensile stress and in this state is releasably fixed in place inside the conduit. This advantageously takes place by a fixation unit present at the front faces of the conduit.

A particularly preferred embodiment of a linear measuring device, which assures a permanent dependable fixation of the measuring body and an extremely simplle replacement proxess for it, is distinguished in that the fixation structure is embodied in the form of at least one elastic hose, in particular in the form of at least two elastic hoses. In this connection an advantageous embodiment is further distinguished in that the inner hollow space of the fixation structure is embodied so it can be evacuated, wherein the hose/hoses is/are evacuated for exchanging the measuring body, so that the measuring body is provided loose in the conduit and can be pulled out in a simple way, and a fresh measuting body cna be inserted thereafter. Subsequiently the hose/hoses is/are again subjected to ambient pressure, because of which they expand and fix the inserted measuring body in place. It is also conceivable to put the hose/hoses under pressure.

Additional fixation structure can be provided in order to assure a permanently dependable fixation in place of the inserted measuring body, by which the measuring body is positively or non/plsitively fixed in the conduit or the groove.

A particularly preferred embodiment of a linear measuring device, which assures a permanent dependable fixation of the measuring body and an extremely simple replacement process for it, is distinguished in that the fixation structure is embodied in the form of at least one elastic hose, in particular in the form of at least two elastic hoses. In this connection an advantageous embodiment is further distinguished in that the inner hollow space of the fixation means structure is embodied so it can be evacuated, wherein the hose/hoses is/are evacuated for exchanging the measuring body, so that the measuring body is provided loose in the conduit and can be pulled out in a simple way, and a fresh measuring body can be inserted thereafter. Subsequently the hose/hoses is/are again subjected to ambient pressure, because of which they expand and fix the inserted measuring body in place. It is also conceivable to put the hose/hoses under pressure.

An advantageous further development which entails advantages in process technology is distinguished in that several guide profiles, arranged one behind the other, are provided, wherein either a continuous measuring body, or one measuring body per guide profile can be provided.

A particularly preferred embodiment, which allows the pick-up of a plurality of measured values without problems, is distinguished in that several conduits, or grooves with a measuring body and fixation means, exist on/in the guide profile, or on/in the machine bed, or on/in specially produced components, which are scanned by appropriate sensor units.

In order to simplify the replacement process, or insertion process, it is advantageous to provide a slide inside the conduit or the groove.

The guide profile can also be circularly designed in the longitudinal direction, i.e. the linear measuring device is used for purposes of circular measurement.

Additional fixation structure can be provided in order to assure a permanently dependable fixation is place of the inserted measuring body, by which the measuring body is positively or non-positively fixed in the conduit or the groove.

A particularly advantageous embodiment, wherein the guide profile has continuous recesses for fasteners for connecting the guide profile on the base, is distinguished in that a further information unit, which can be preferably designed as a magnetic unit, is arranged in at least one recess and contains information regarding reference points or end positions, which can be evaluated by a sensor.

Further embodiments and advantages of the present invention ensue from the characteristics further listed in the claims, as well as from the exemplary embodiments listed in what follows. The characteristics of the claims can be combined with each other in any arbitrary manner, provided they are not obviously mutually exclusive.

The present invention, as well as advantageous further developments thereof, will be described in greater detail and explained in what follows by means of the examples represented in the drawings. The characteristics which can be taken from the description or the drawings can be applied individually by themselves or in any arbitrary combination with each other in accordance with the present invention. Shown are in:

Figure 5:
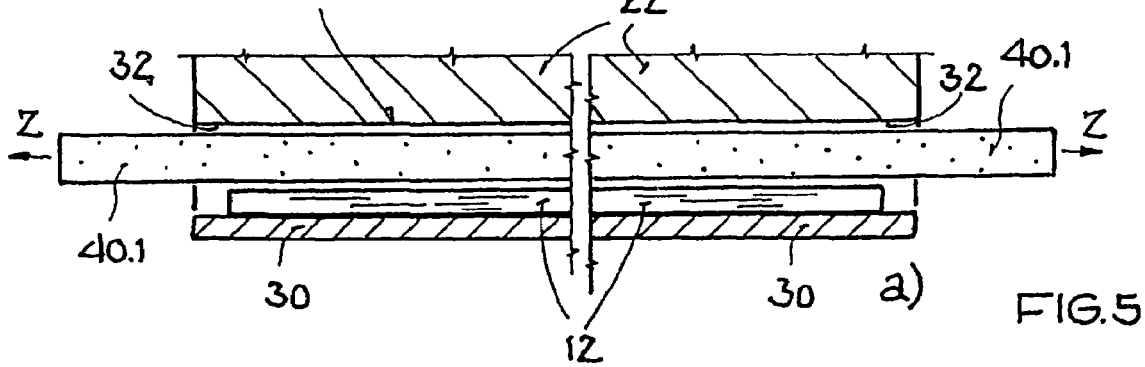
Figure 13:
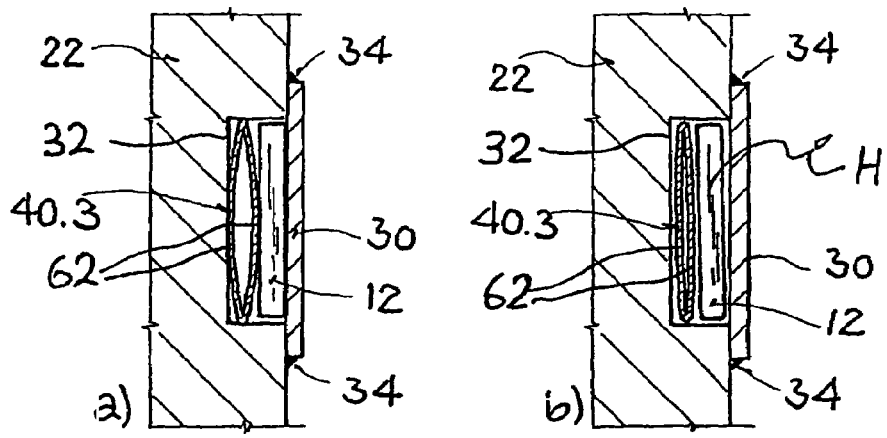
Figure 14:
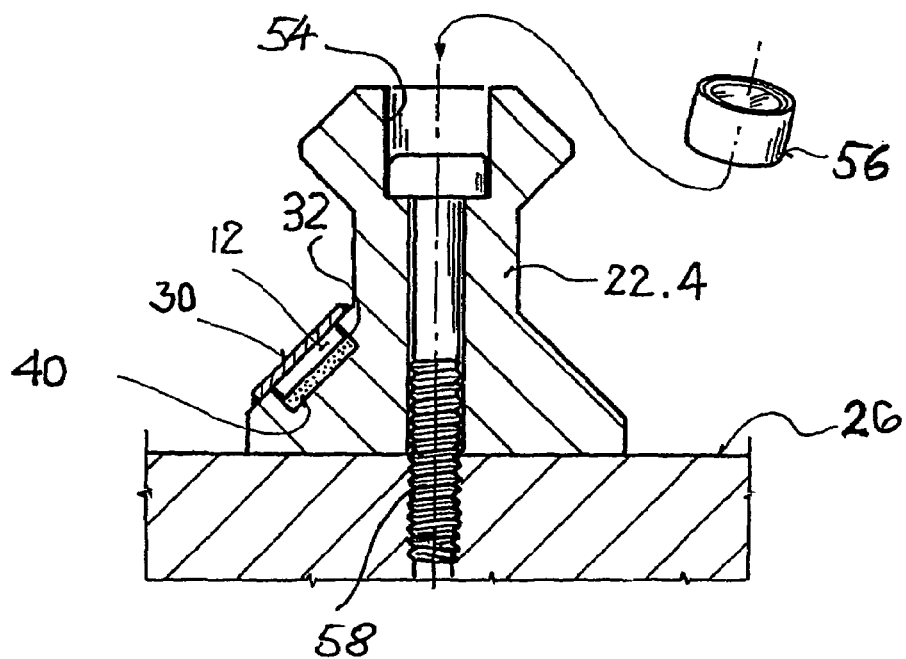
Figure 15:
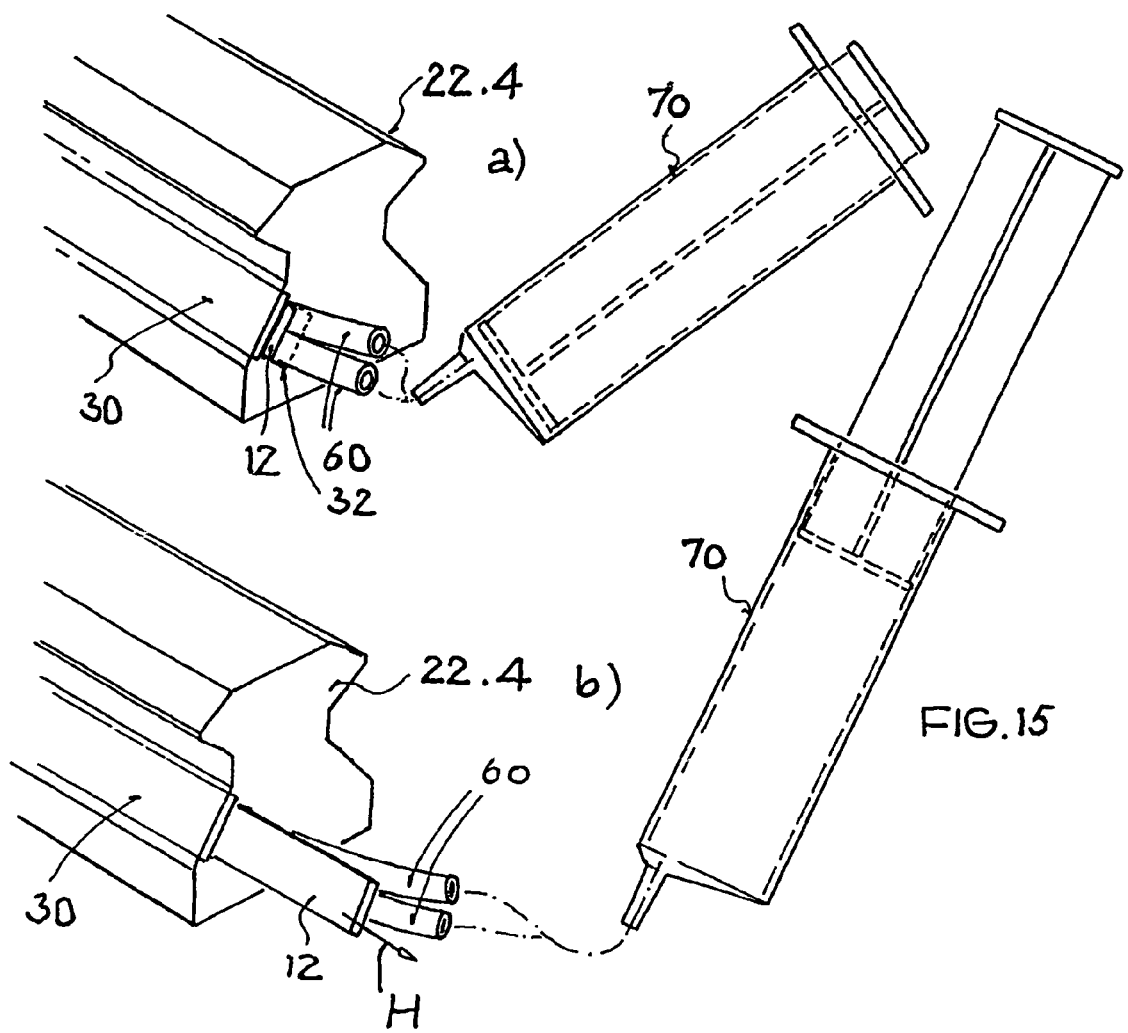

FIGS. 3a, b a schematic cross section through a closed conduit with an embodiment of an inserted fixation means structure in the fixed (FIG. 3a) and non-fixed (FIG. 3b) state, wherein the fixation structure embodied as cellular tape bodies in accordance with the present invention;

FIGS. 4a, b show a schematic section representation from above of the closed conduit in the non-fixed state in accordance with FIG. 3b, and in the fixed state in accordance with FIG. 3a;

FIGS. 5a, b show a schematic cross-sectional representation of a view from above of the employment of an embodiment of a rubber band in the inserted state (FIG. 5a) and in the fixed state (FIG. 5b) in accordance with the present invention;

FIGS. 6a, b show a schematic cross-sectional representation of a view from above of the employment of an embodiment of a corrugated tape in the non-fixed state (FIG. 6a) and in the fixed state (FIG. 6b) in accordance with the present invention:

FIGS. 7a, b show a schematic section through a conduit with an embodiment of a concavely inward arched cover tape, which in accordance with FIG. 7b fixes the introduced measuring body in place in accordance with the present invention;

FIG. 8 shows a schematic cross section through a conduit with an embodiment of an inserted fixation means structure embodied as screws in accordance with the present invention;

FIGS. 9a, b show a schematic cross section through a conduit area with an embodiment of an inserted fixation structure in the fixed (FIG. 9a) and non-fixed (FIG. 9b) state, wherein the fixation structure are embodied as two elastic hoses;

FIG. 10 shows a schematic detailed perspective of a second embodiment of a linear measuring device having a sensor arranged laterally on a carriage in accordance with the present invention;

FIGS. 11a, b is a schematic lateral view of an embodiment of a linear measuring device with several guide profiles arranged one behind the other; in accordance with the present invention;

FIG 12 is a schematic view from above on an embodiment of a linear measuring device with guide profiles arranged in circles; in accordance with the present invention;

FIGS. 13a, b show a schematic cross sectional representation through a conduit area with an embodiment of an inserted fixation structure in the fixed (FIG. 13a) and non-fixed (FIG. 13b) state, wherein the fixation structure is embodied as a metallic hollow-profiled tape with convexly outward curved wall units in accordance with the present invention;

FIG. 14 shows a schematic section through the profiled unit in accordance with FIG. 10 in the area of a continuous recess, in which an additional information unit is arranged;

FIGS. 15a, b show a schematic detailed perspective of the replacement process of the measuring body by the employment of syringes, wherein elastic hoses in accordance with FIGS. 9a, b are employed as a fixation structure; and FIG. 16 shows a schematic cross-sectional representation of an embodiment of a guide profile with two grooves, in each of which a measuring body and an embodiment of a fixation structure is arranged.

DESCRIPTION OF THE PREFERRED EMBODIMENT(S) OF THE INVENTION

Figure 2:
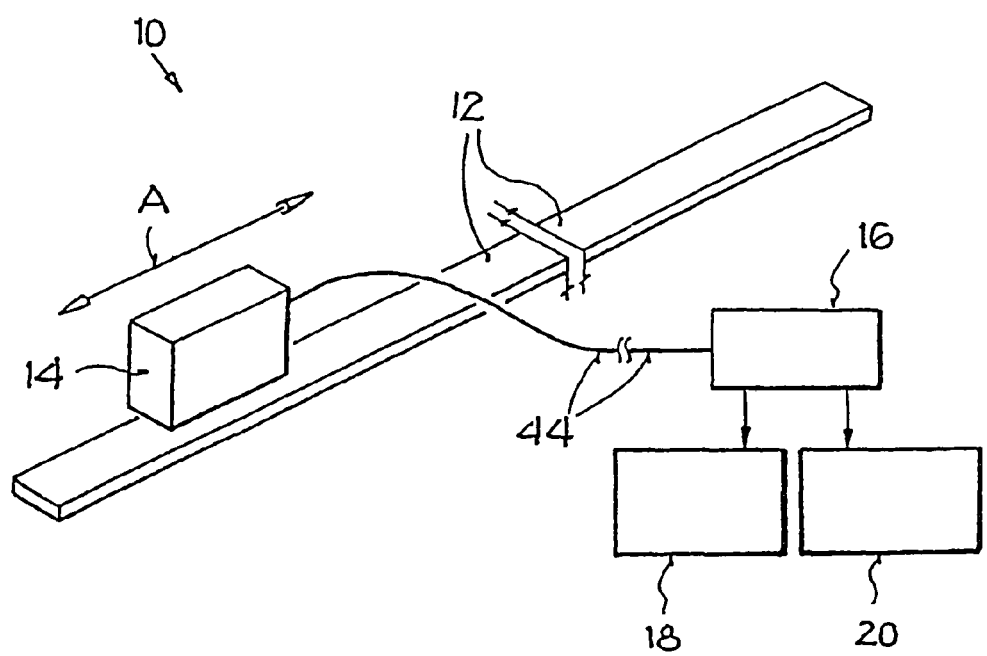
FIG. 2 shows a greatly schematized representation of the basic principle of a known linear measuring device.

A linear measuring device 10 is schematically represented in FIG. 2, which shows the construction in principle. A measuring body 12 is fastened on a component, not shown in detail, which is embodied in a tape-like manner and, in the represented exemplary embodiment, has a ferritic material bound in polymer. A magnetic alternating field is generated above the measuring body by a systematic magnetization with alternating south and north poles.

At the same time there is a sensor/sensors 14, which movably scans/scan the measuring body 12 in its longitudinal direction A. The sensor/sensors converts/convert the field strength differences, present on the magnetic measuring body 12 because of the changing field strength, into signals, which it/they passes/pass on to an electronic evaluation unit 16 via a connecting cable 44. The evaluation unit 16 detects the signals coming from the sensor/sensors 14 and evaluates them. The evaluated signals are supplied, for example, to a display unit 18, or a memory or further processing unit 20. The measuring system can also be embodied as an inductive measuring system.

Figure 1:
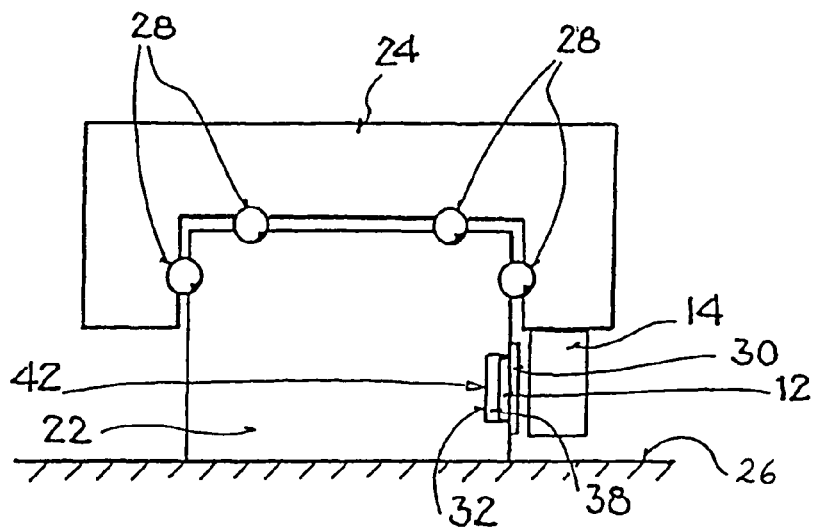
FIG. 1 shows a greatly schematized cross section through a guide profile with a carriage placed on it, which is movable in the longitudinal direction and whose position is to be determined with the use of a measuring body provided inside a closed conduit and whose information is detected by a sensor head fastened on the carnage in accordance with the present invention.

FIG. 1 shows a practical implementation of the use of the linear measuring device in accordance with the present invention if the framework of a guide profile 22 arranged on a base 26. A U-shaped carriage 24 is longitudinally displaceably seated by a roller bearing 28 above the rectangular-shaped guide profile 22 a groove 32 has been milled into the right lower lateral wall of the guide profile 22 which, together with a cover tape 30 applied to the outside, for instance welded on, forms a closed conduit 42.

A sensor/sensors 14 is/are seated on the carriage 24 directly in front of the conduit 42, which is/are longitudinally displaceable along with the carriage 24, and scans/scan a measuring body 12 located inside the conduit 42 for detecting the longitudinal position.

Figure 3:
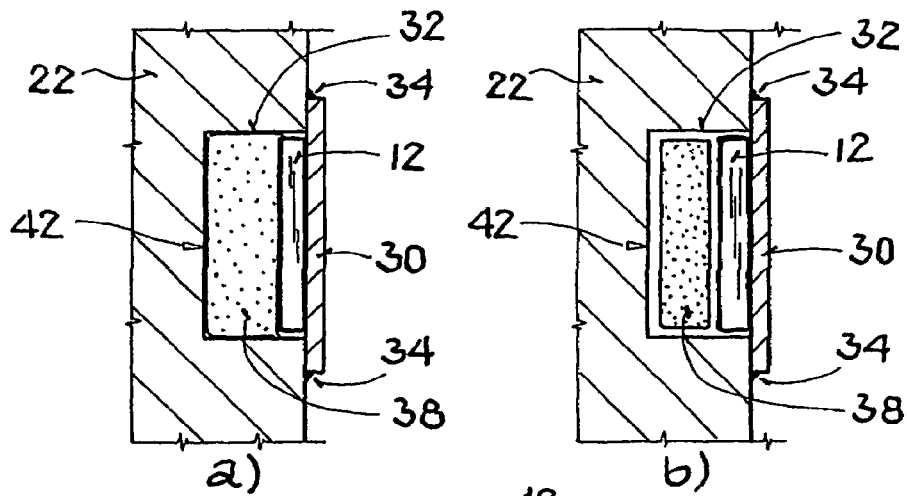
Figure 4:
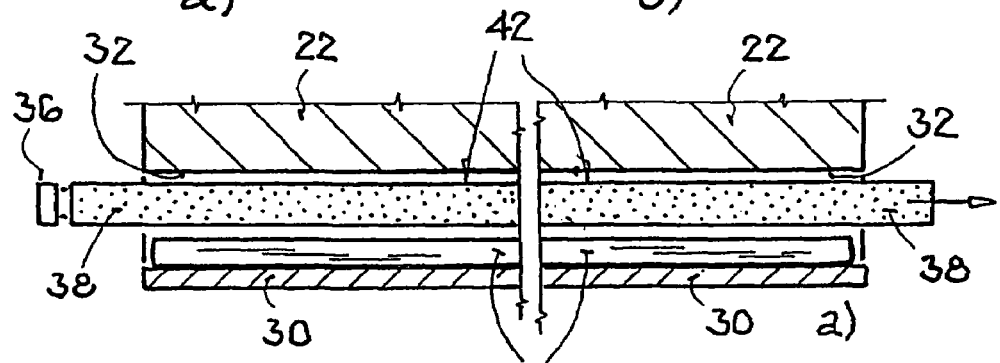

A first exemplary embodiment is represented in FIGS. 3 and 4.

As in FIG. 1, the sheet metal cover 30 is welded to the front end face of the component, for example by weld seams 34, by which the conduit 42 is formed together with the groove 32.

A cellular tape body 38 is used, which has an air-tight envelope and a valve unit 36 on its front face. At first the cellular tape body 38 has cross-sectional contours which permit it to be pushed into the conduit 42. Insertion takes place after the tape-shaped measuring body 12 has been pushed into the conduit 42. This situation is represented in FIG. 4a.

After the cellular tape body 38 has been pushed into its end position in the conduit 42, the valve unit 36 is opened, so that any arbitrary liquid or gaseous medium flows in and leads to an increase of the cross-sectional dimensions of the cellular tape body 38, which has the result that the measuring body 12 is pressed against the inner wall of the cover tape 30 and fixed in place there, and the cellular tape body 38 is elastically clamped inside the conduit 42. In this position the dependable fixation of the measuring body 12 is assured, so that the measurements required during operation can be dependably performed by the sensor/sensors.

If now the need for replacing the measuring body arises, for example if there are defects, the introduced medium is again removed in a simple manner through the valve unit 36, which results in a reduction of the cross-sectional dimensions of the cellular tape body. In this state the measuring body 12 is in its released position inside the conduit 42 and can be pulled out without problems from a front end. Subsequently a fresh measuring body 12 can be inserted, which is fixed in place in that medium is again supplied to the cellular tape body 38 through the valve unit 36, so that this cellular tape body 38 presses the measuring body 12 against the inner wall of the cover tape 30 for a dependable positional fixation. Air, for example, can be used as the medium.

In a further exemplary embodiment in accordance with FIGS. 5a and b, an elastic tape body is used as the fixation means structure for the measuring body 12, which is embodied as a rubber band 40.1. In the course of assembly, the rubber band 40.1 is tensed (arrow Z) and inserted into the conduit 42. As soon as the tensile force effect is released, the cross-sectional dimensions of the rubber band 40.1 increase and thereby press the measuring body 12 against the inside of the cover tape 30.

If the measuring body is to be replaced, a tensile force is exerted on the rubber band 40.1, which causes a reduction of the cross-sectional dimensions of the band itself, so that the measuring body 12 is released from its fixation and can be pulled out of the front end of the conduit 42. Thereafter a fresh measuring body 12 is inserted into the conduit 42 and the tensile stress on the rubber band is released, so that the newly inserted measuring body 12 is dependably permanently fixed in place inside the conduit 42.

A further embodiment is represented in FIGS. 6a and b, wherein the rubber band 40.1 has been replaced by a corrugated tape 40.2, whose cross-sectional dimensions are also reduced by tensile stress Z, by means of which the insertion, or removal of the measuring body 12 is assured. The dependable fixation in place of the measuring body 12 inside the conduit 42 takes place after the tensile force Z is released. The measuring body 12 is elastically pressed against the inside of the cover tape 30—respectively at points in the area of the extreme points of the corrugated tape 40.2. The corrugated tape 40.2 is simultaneously clamped inside the conduit 42.

An embodiment variation which is independent of the above mentioned exemplary embodiments is distinguished in that a cover tape 30.1 is employed, which has a concave arch pointing in the direction of the groove 32 as viewed outside of the groove. The cover tape 30.1 also has elastic properties, i.e. that a draw-in of the measuring body 12 is possible, wherein with the measuring body 12 drawn in, the cover tape 30.1 exerts an elastically acting pressure D on the measuring body, so that in the inserted state the latter is releasably clamped in place.

Economical employment possibilities are opened by the represented linear measuring devices, which have as their particular aim the ability of replacing a measuring body without problems in case of a malfunction, without it being necessary to replace guide profiles, machine bed units or other components in their entirety. According to the present invention that a problem-free, and therefore economical replacement is possible by the employment of releasable fixation structure within a closed conduit, in which the measuring body is arranged. Therefore the employment of the linear measuring system in accordance with the invention makes possible the replacement, or a repair of the linear measuring system without it being necessary to replace cost-intensive guide profiles, machine bed arrangements or components.

An embodiment variation is represented in FIG. 8, wherein the measuring body inserted into the conduit 42 is fixed in place by a screw unit 50, which has been inserted through a recess 52 in the back of the guide profile 22. Viewed in the longitudinal direction of the measuring body 12, several screws 50 are provided in a preset grid pattern. It is also possible to employ other fixation elements besides screws 50, which have the capability of being releasably fixed in place on the guide profile, and at the same time to press the measuring body 12 against the rear wall of the sheet metal cover 30.

An advantageous embodiment of a linear measuring device in accordance with the present invention, which has particularly proven itself in actual use, is represented in FIGS. 9a and b. As in the exemplary embodiment in accordance with FIGS. 3a and b, the conduit 42 is constituted by a groove 32 milled into the guide profile 22 and an exterior closing cover tape 30. Two elastic hoses 60 are arranged in the bottom of the groove, which are under ambient pressure and because of their elasticity push the measuring body 12 arranged on the top against the inner wall of the cover tape 30, so that the measuring body 12 is fixed in its position.

The replacement of the measuring body 12 is schematically represented in FIGS. 15a and b. The elastic hoses 60 are closed airtight (not represented) in one of their end areas. Then a syringe 70 is placed into the other end area. The interior of the hoses 60 is at least partially evacuated by the syringe, so that the interior contracts. As a result the elastic clamping effect against the measuring body 12 is canceled. This state is also shown in cross section in FIG. 9b. In the state in accordance with FIG. 15b, or 9b, the measuring body 12 can be pulled out of the conduit 42 in a simple way (arrow H), and a fresh measuring body 12 can thereafter be inserted into the conduit 42. Following the insertion of the fresh measuring body 12, the hoses are again set under ambient pressure, so that they expand and press the measuring body 12 in an elastically clamping way against the inner wall of the cover tape 30.

For easing the pull-out or insertion of the measuring body, a slip additive 57 can be provided inside the conduit 42 as shown in FIGS. 9a)–b).

It is also conceivable to put the hoses under pressure, by which a clearly defined pressing force against the measuring body 12 can be set.

A further embodiment of a linear measuring device 10.1 is represented in FIG. 10, which has a guide profile 22.4 which has U-shaped recesses with inclined flanks on both of its lateral longitudinal edges. The groove 32 is formed in the right lower flank, in which the fixation structure and the measuring body 12 are arranged. The groove 32 is closed off by the cover tape 30. A guide carriage 24.1 slides positively in the longitudinal direction on the guide profile 22.4. A sensor 14.1 is connected on the side of the guide carriage 24.1, which passes the signals detected from the measuring body 12 on to the evaluation unit 16 via the connecting cable 44.

The guide profile 22.4 has continuous recesses 54, which are provided in a grid-shape, are spaced apart in the longitudinal direction and are primarily used for connecting the guide profile 22.4 by inserted fasteners 58 (also see FIG. 14) with the base 26. In addition, a further information unit 56 is inserted in the top of the recess 54, which is preferably designed as a magnetic unit. The information unit 56 contains information regarding possible reference points, or end positions, which are also detected by the sensor 14.1.

Finally, it is also schematically indicated in FIG. 10 that the measuring body 12 is exactly maintained in its position inside the groove by additional fixation structure 80. In the exemplary embodiment represented, the additional fixation structure 80 is embodied as a screw, which has been screwed in from the outside through the cover tape. In embodiment variations which are not represented, the additional fixation structure can be embodied as non-positive, as well as positive fixation structure.

FIG. 11a shows several guide profiles 22.1, 22.2, 22.3, which are arranged one behind the other, into which a continuous measuring body 12 is inserted. The embodiment variation in accordance with FIG. 11b differs from the one in accordance with FIG. 11a in that each guide profile 22.1, 22.2, 22.3, has its own measuring body 12.1, 12.2, 12.3, i.e. there is no continuous measuring body provided.

A view from above on a linear measuring device is schematically represented in FIG. 12, wherein the guide profile 22.5 is circularly embodied in the longitudinal direction, i.e. the linear measuring device is used for circular measurements.

FIGS. 13a and b show another embodiment variation of the fixation means structure 40.3. In this exemplary embodiment, the fixation means-are designed as a metallic hollow tape body, wherein the hollow tape body is constituted by two convexly outside curved elastic sheet metal wall units 62, which are connected on the lateral longitudinal edges, preferably welded together.

The fixation principle, or the replacement possibility, functions similar to the process already described in connection with FIGS. 15a, b. Under ambient pressure, the metallic tape body 40.3 in accordance with FIG. 13a is expanded, so that it presses the measuring body 12 against the inner wall of the sheet metal cover 30 and fixes it in place. For replacing the measuring body 12, an underpressure is generated in the interior of the tape body 40.3, so that the interior volume of the tape body 40.3 is reduced—as represented in FIG. 13b. In this state the measuring body 12.3 can be removed (arrow H), and a fresh measuring body 12 can be inserted.

In the cross section of a guide profile 22.6 represented in FIG. 16, which substantially has the same cross-sectional contour as the guide profile 22.4 in accordance with FIG. 10, a further groove 32 is also provided on the opposite lower flank of the guide profile 22.6, in which the measuring body 12 and the fixation means structure 40 are arranged. It is moreover possible to provide additional grooves with inserted measuring bodies 12 and fixation structure 40, not further represented in FIG. 16.

The present invention may be embodied in other forms than those specifically disclosed herein without departing form its spirit or essential characteristics. The described embodiments are to be considered in all respects only as illustrative and not restrictive, and the scope of the invention is commensurate with the appended claims rather than the foregoing description.

We claim:

1. A linear measuring device comprising:
   a tape-shaped measuring body that is arranged in a closed conduit, which is opened on at least one front face;
   a sensor, which is moved along said measuring body and said sensor picks up information stored on said measuring body;
   an evaluation unit, which evaluates said information obtained from said sensor and processes said information further;
   a fixation structure provided inside said conduit, which releasably fixes said measuring body in place inside said conduit in such a way that, when needed, said measuring body is replaced by being removed from a front face of said conduit.

2. The linear measuring device in accordance with claim 1, wherein said fixation structure fixes said measuring body in place by an elastically applied pressure.

3. The linear measuring device in accordance with claim 1, wherein said fixation structure presses said measuring body against an inner wall area of said conduit facing said sensor.

4. The linear measuring device in accordance with claim 1, wherein said fixation structure is a closed tape body, wherein cross sectional dimensions of said tape body are changed by changing a volume within said tape body by a liquid or gaseous medium.

5. The linear measuring device in accordance with claim 4, wherein said rape body is a cellular tape body, which can be at least partially evacuated or expanded.

6. The linear measuring device in accordance with claim 1, wherein said fixation structure is a tape body with an elastic hollow profiled cross section, wherein cross sectional dimensions of said tape body are changed by changing a volume of said profiled cross section by a liquid or gaseous medium.

7. The linear measuring device in accordance with claim 1, wherein said fixation structure comprises an elastic tape body, whose cross-sectional dimensions are changed by changing a tensile force acting on said elastic tape body.

8. The linear measuring device in accordance with claim 7, wherein said elastic tape body is a rubber band.

9. The linear measuring device in accordance with claim 7, wherein said elastic tape body is a corrugated tape.

10. The linear measuring device in accordance with claim 1, wherein said closed conduit comprises:
a groove existing in a component; and
a cover tape covering said groove.

11. The linear measuring device in accordance with claim 10, wherein said cover tape is a sheet metal cover and is attached to said component.

12. The linear measuring device in accordance with claim 1, wherein a wall of said conduit assigned to said sensor is an elastic wall, concavely arched inward into said conduit and, in a state where said measuring body is inserted into said conduit, said measuring body pushes said wall outward and is clampingly held thereby.

13. The linear measuring device in accordance claim 1, wherein said measuring body is a flexible measuring body tape.

14. The linear measuring device in accordance with claim 1, wherein said measuring body is a rigid measuring body.

15. The linear measuring device in accordance with claim 1, wherein said sensor picks up different magnetic field strengths existing on said tape-shaped measuring body, and emits a signal to said evaluation unit.

16. The linear measuring device in accordance with claim 1, wherein said closed conduit, said sensor, and said fixation structure are supported by a guide profile.

17. The linear measuring device in accordance with claim 16, wherein several conduits are formed in said guide profile and wherein a measuring body and a fixation structure is provided in said several conduits.

18. The linear measuring device in accordance with claim 16, wherein said guide profile extends circularly in a longitudinal direction.

19. The linear measuring device in accordance with claim 16, wherein said guide profile comprises continuous recesses for a fastener for connecting said guide profile on said base;
an information unit is arranged in at least one of said recesses, and contains information regarding reference points or end positions, which can be evaluated by a sensor.

20. The linear measuring device in accordance with claim 19, wherein said information unit is a magnetic unit.

21. The linear measuring device in accordance with claim 1, wherein said closed conduit, said sensor, and said fixation structure are supported in a machine bed.

22. The linear measuring device in accordance with claim 1, wherein said sensor picks up varying permeability values existing on said tape-shaped measuring body, and emits a signal to said evaluation unit.

23. The linear measuring device in accordance with claim 1, wherein said fixation structure comprises individual elements, which are inserted from a rear of said conduit through a recess of a component enclosing said conduit and fixed in place.

24. The linear measuring device in accordance with claim 23, wherein said fixation structure comprises a screw.

25. The linear measuring device in accordance with claim 24, wherein said fixation structure comprises a preset grid pattern along a longitudinal axis of said measuring body.

26. The linear measuring device in accordance with claim 23, wherein said fixation structure comprises a preset grid pattern along a longitudinal axis of said measuring body.

27. The linear measuring device in accordance with claim 1, wherein said measuring body is contained inside said conduit under prestress.

28. The linear measuring device in accordance with claim 1, wherein said fixation structure comprises an elastic hose.

29. The linear measuring device in accordance with claim 28, wherein an inner hollow chamber of said elastic hose is at least partially evacuated.

30. The linear measuring device in accordance with claim 28, wherein an inner hollow chamber of said elastic hose is placed under pressure or ambient pressure.

31. The linear measuring device in accordance with claim 1, wherein said fixation structure is a metallic rape body comprising two convexly curved elastically resilient wall units, which are connected to one another along lateral longitudinal edges.

32. The linear measuring device in accordance with claim 31, wherein an inner hollow chamber of said metallic tape body is at least partially evacuated.

33. The linear measuring device in accordance with claim 31, wherein an inner hollow chamber of said metallic tape body is placed under pressure or ambient pressure.

34. The linear measuring device in accordance with claim 1, wherein said fixation comprises a valve unit.

35. The linear measuring device in accordance with claim 1, further comprising several guide profiles, arranged one behind the other, wherein said measuring body is continuous and present in each of said several guide profiles.

36. The linear measuring device in accordance with claim 1, further comprising several guide profiles, arranged one behind the other, wherein said measuring body is made of several parts that are provided in said several guide profiles.

37. The linear measuring device in accordance with claim 1, further comprising a sup additive that is provided inside said conduit.

38. The linear measuring device in accordance with claim 1, further comprising a second fixation structure, which fixes said measuring body positively in said conduit.

39. The linear measuring device in accordance with claim 1, further comprising a second fixation structure, which fixes said measuring body non-positively in said conduit.

40. The linear measuring device in accordance with claim 1, wherein said sensor is outside of said closed conduit.

* * * * *

UNITED STATES PATENT AND TRADEMARK OFFICE
CERTIFICATE OF CORRECTION

| | | |
|---|---|---|
| PATENT NO. | : 7,007,398 B2 | Page 1 of 1 |
| APPLICATION NO. | : 10/451497 | |
| DATED | : March 7, 2006 | |
| INVENTOR(S) | : Claudia Wahl et al. | |

It is certified that error appears in the above-identified patent and that said Letters Patent is hereby corrected as shown below:

<u>In the Claims</u>

Column 10, in claim 5, line 58, replace "rape" with --tape--.

Column 12, in claim 37, line 45, replace "sup" with --slip--.

Signed and Sealed this

Thirtieth Day of January, 2007

JON W. DUDAS
*Director of the United States Patent and Trademark Office*